United States Patent
McCulloch McKenzie et al.

(10) Patent No.: US 9,348,486 B2
(45) Date of Patent: May 24, 2016

(54) METHOD AND DEVICE FOR PERFORMING VISUAL SET OPERATIONS TO MODIFY AND GENERATE LISTS

(71) Applicant: RESEARCH IN MOTION LIMITED, Waterloo (CA)

(72) Inventors: Donald Somerset McCulloch McKenzie, Waterloo (CA); Jerome Pasquero, Montreal (CA); Aleksandar Papo, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 353 days.

(21) Appl. No.: 13/633,179

(22) Filed: Oct. 2, 2012

(65) Prior Publication Data

US 2014/0092126 A1      Apr. 3, 2014

(51) Int. Cl.
*G09G 5/00*     (2006.01)
*G06F 3/0482*   (2013.01)
*G09G 5/36*     (2006.01)

(52) U.S. Cl.
CPC .............. *G06F 3/0482* (2013.01); *G09G 5/363* (2013.01); *G09G 2370/022* (2013.01)

(58) Field of Classification Search
CPC .... G06Q 10/10; H04L 51/22; H04L 12/5855; H04L 51/28; H04L 67/34
USPC ........................................................ 345/629
See application file for complete search history.

(56) References Cited

U.S. PATENT DOCUMENTS

| | | | | |
|---|---|---|---|---|
| 5,471,578 A * | 11/1995 | Moran et al. | ................... | 715/863 |
| 5,778,382 A * | 7/1998 | Hatori | | |
| 5,784,061 A * | 7/1998 | Moran et al. | ................... | 715/863 |
| 5,861,886 A * | 1/1999 | Moran et al. | ................... | 715/863 |
| 5,966,126 A | 10/1999 | Szabo | | |
| 6,717,957 B1 * | 4/2004 | Quine | ................... | 370/487 |
| 7,895,263 B1 * | 2/2011 | Kirchmeier et al. | ................... | 709/203 |
| 8,560,950 B2 * | 10/2013 | Bull et al. | ................... | 715/716 |
| 2005/0010645 A1 * | 1/2005 | Arshi et al. | ................... | 709/207 |
| 2007/0255789 A1 | 11/2007 | Buchheit | | |
| 2008/0016467 A1 * | 1/2008 | Chambers et al. | ................... | 715/835 |
| 2009/0113446 A1 | 4/2009 | Hamilton et al. | | |
| 2009/0322756 A1 | 12/2009 | Robertson et al. | | |
| 2012/0096352 A1 * | 4/2012 | Maor et al. | ................... | 715/706 |

OTHER PUBLICATIONS

Corresponding European Patent Application No. 12186916.8 Search Report dated Apr. 3, 2013.

* cited by examiner

*Primary Examiner* — Barry Drennan
*Assistant Examiner* — Jason Pringle-Parker
(74) *Attorney, Agent, or Firm* — Perry + Currier, Inc.

(57) ABSTRACT

A device, method and system or performing visual set operations to modify and generate lists, and methods thereof are provided. Provided at a display of a device, are: a first graphical representation indicative of a first list and a second graphical representation indicative of a second list, the first list and the second list comprising common elements, and a graphical intersection of the first graphical representation and the second graphical representation is indicative of the common elements. Via a processor of the device, the graphical intersection is separated from one or more of the first graphical representation and the second graphical representation, such that one or more additional lists are generated based on the separating, each of the one or more additional lists comprising a respective one of: the common elements; the first list minus the common elements; and, the second list minus the common elements.

22 Claims, 12 Drawing Sheets

200

```
┌─────────────────────────────────────────┐
│ Provide A First Graphical Representation Indicative Of A │
│ First List And A Second Graphical Representation │
│ Indicative Of A Second List, The First List And The │
│ Second List Comprising Common Elements, And A │
│ Graphical Intersection Of The First Graphical │
│ Representation And The Second Graphical │
│ Representation Is Indicative Of The Common Elements │
│ 201 │
└─────────────────────────────────────────┘
                    ↓
┌─────────────────────────────────────────┐
│ Separate The Graphical Intersection From One Or More │
│ Of The First Graphical Representation And The Second │
│ Graphical Representation │
│ 203 │
└─────────────────────────────────────────┘
                    ↓
┌─────────────────────────────────────────┐
│ Generate One Or More Additional Lists Based On The │
│ Separating, Each Of The One Or More Additional Lists │
│ Comprising A Respective One Of: The Common │
│ Elements; The First List Minus The Common Elements; │
│ And, The Second List Minus The Common Elements │
│ 204 │
└─────────────────────────────────────────┘
```

Fig. 2

METHOD AND DEVICE FOR PERFORMING VISUAL SET OPERATIONS TO MODIFY AND GENERATE LISTS

FIELD

The specification relates generally to electronic devices, and specifically to a device for performing visual set operations to modify and generate lists, and methods therefor.

BACKGROUND

The evolution of computers is currently quite active in the electronic device environment. It is now well-known to including calendaring, contacts, and messaging functions in electronic devices. More recently, there has been a veritable explosion of the number and type of applications that are configured to the unique form factors and computing environments of various types of electronic devices.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 2 depicts a flowchart of a method for performing visual set operations to modify and generate lists, according to non-limiting implementations.

Figure 8:
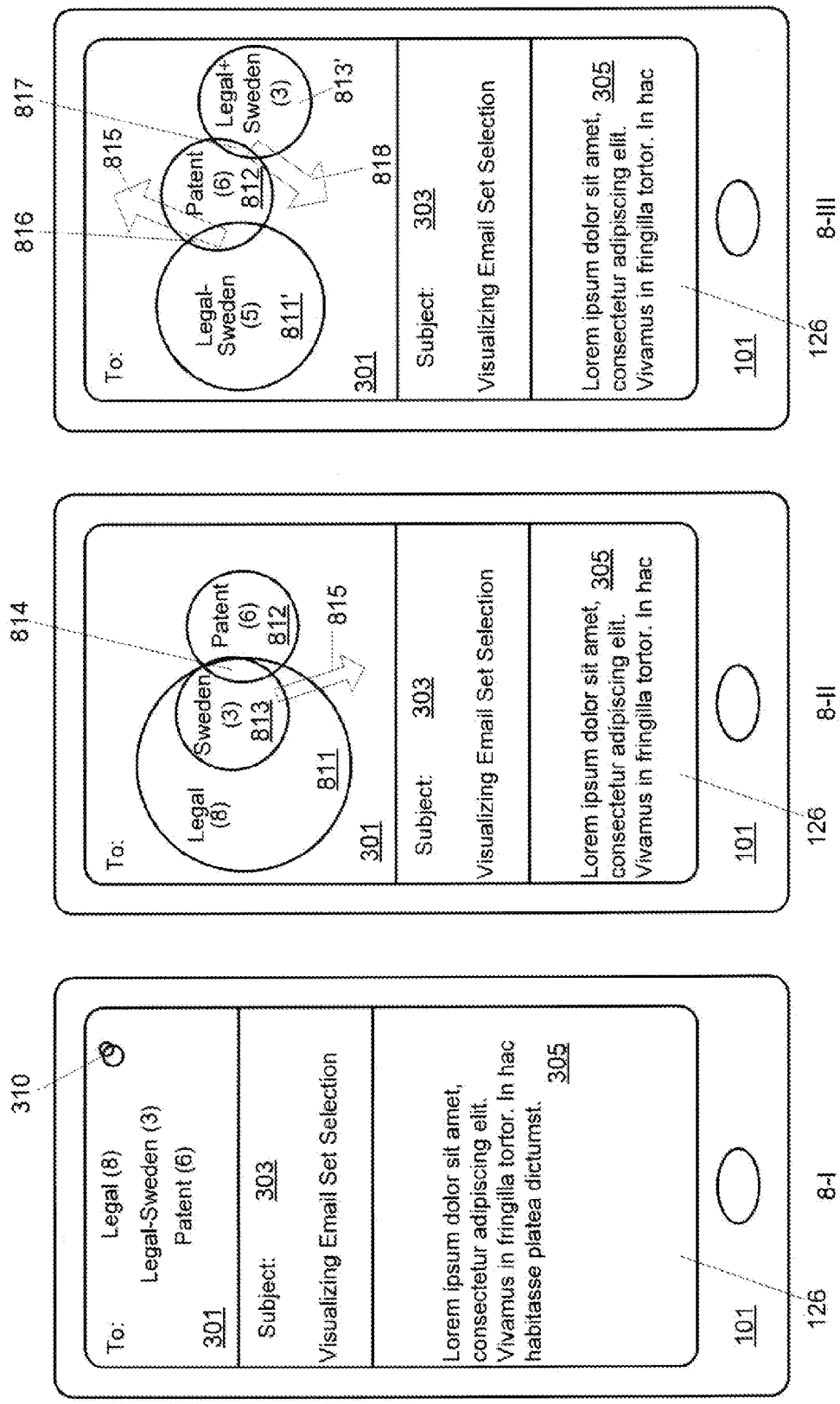
FIG. 8 depicts a sequence of graphical user interfaces provided at the device of FIG. 1, when performing visual set operations to modify and generate lists, according to non-limiting implementations.
Figure 9:
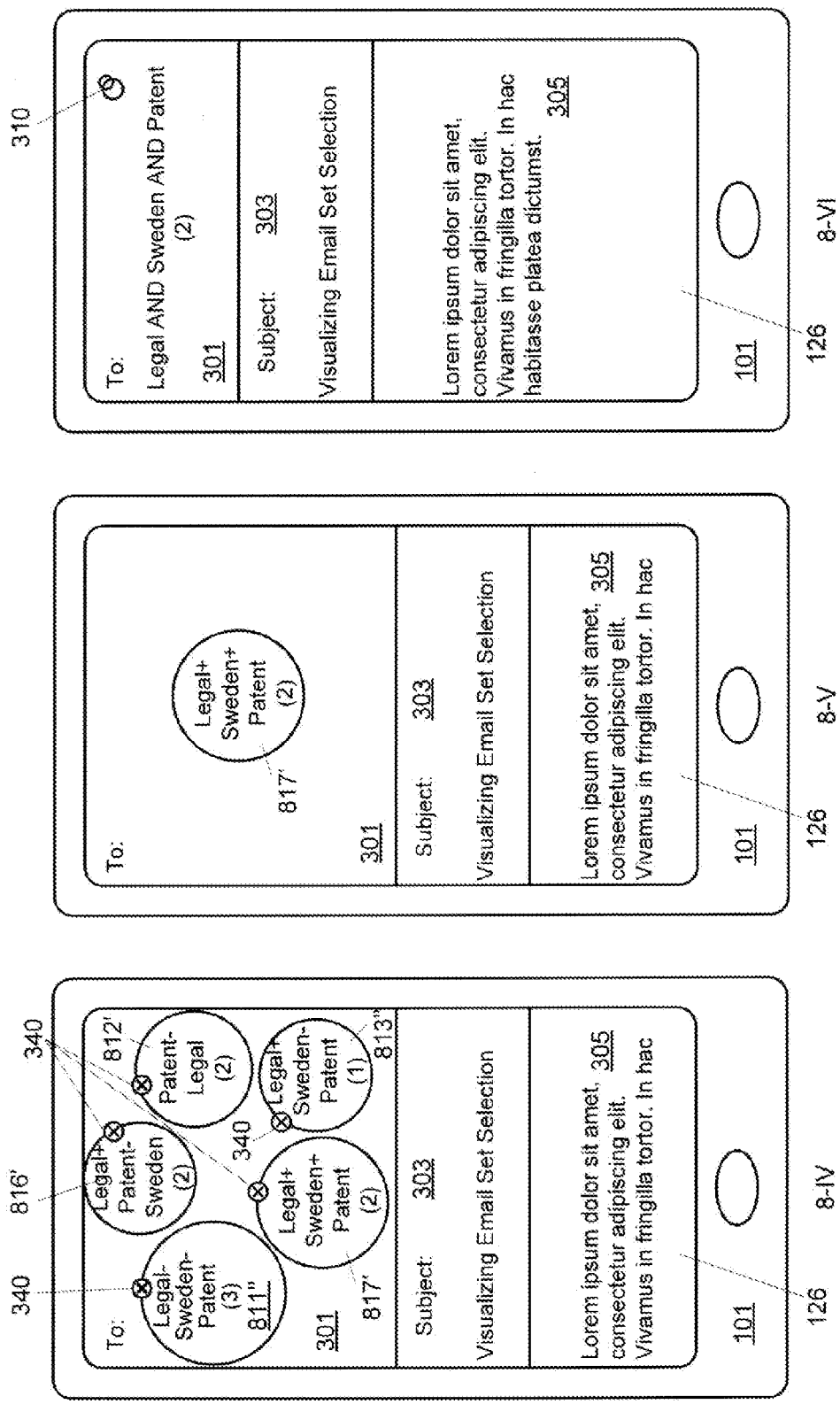

FIG. 9 continues the sequence of graphical user interfaces of FIG. 8, according to non-limiting implementations.

Figure 1:
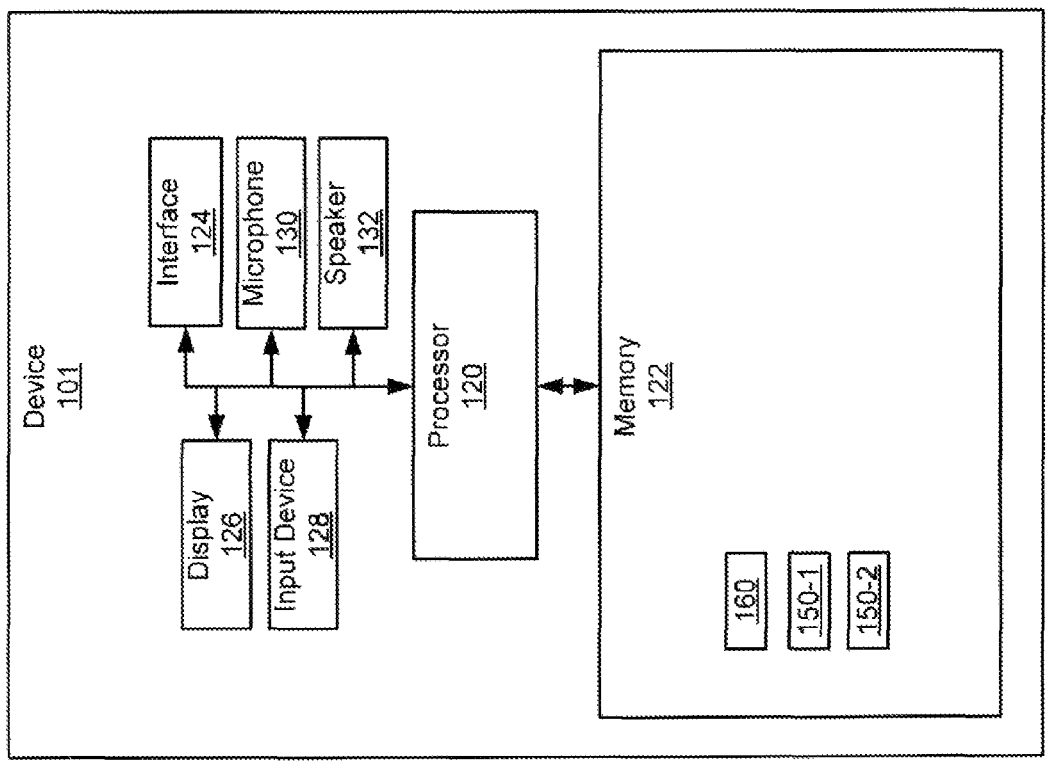
FIG. 1 depicts a device for performing visual set operations to modify and generate lists, according to non-limiting implementations.
Figure 10:
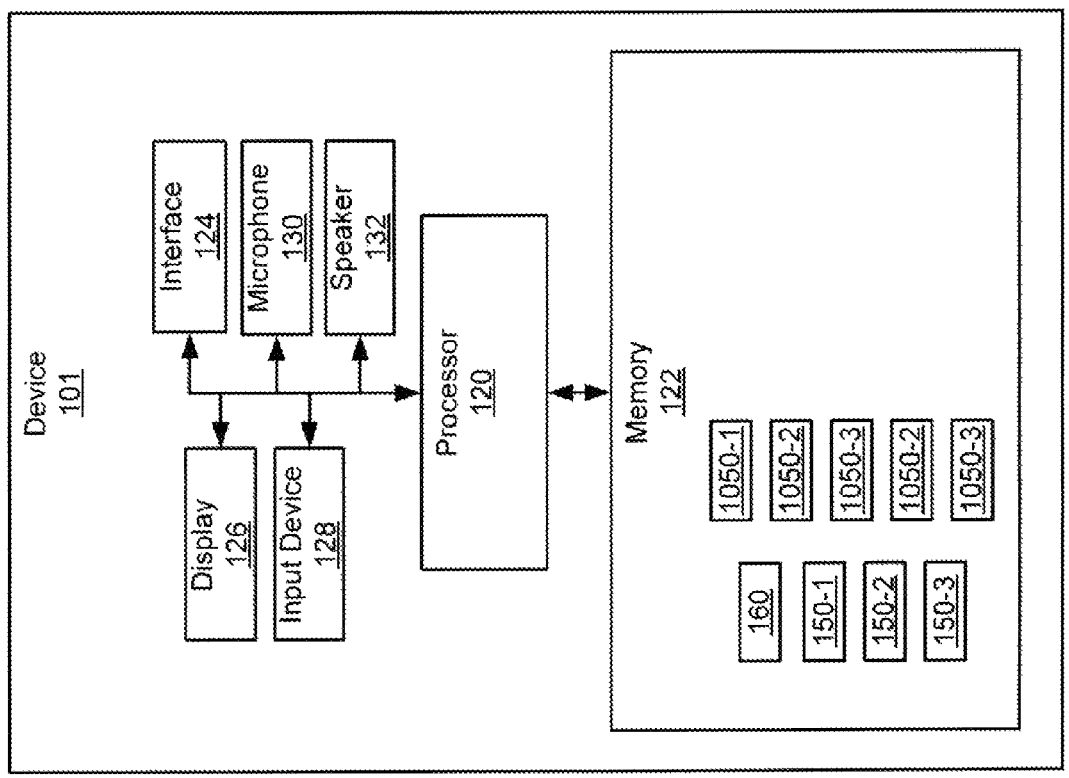

FIG. 10 depicts the device of FIG. 1, with lists generated via the method of FIG. 2, stored therein, according to non-limiting implementations.

Figure 11:
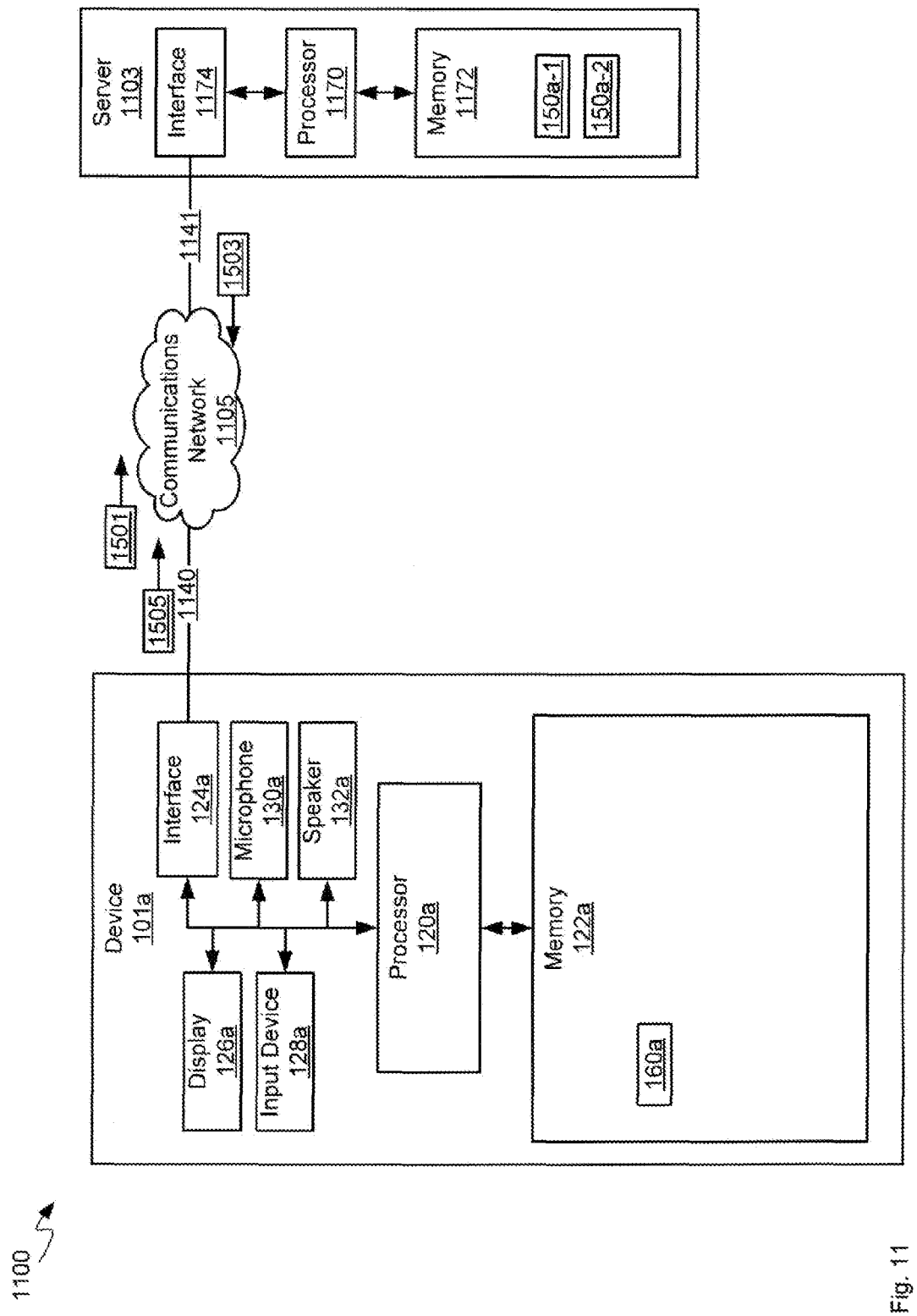

FIG. 11 depicts a system for performing visual set operations to modify and generate lists, with lists stored at server, and visual set operations occurring at a device, according to non-limiting implementations.

Figure 12:
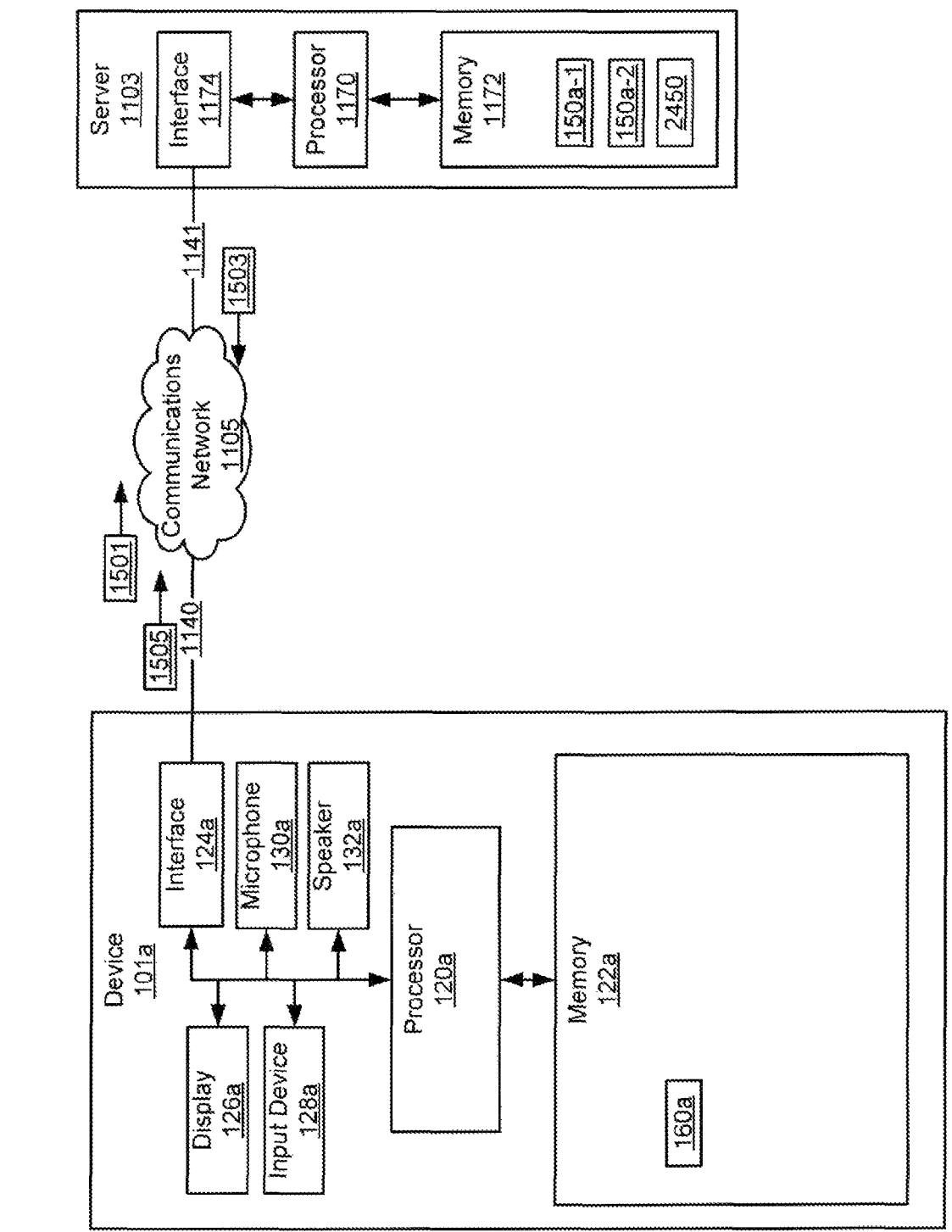

FIG. 12 depicts the system of FIG. 11 with one or more additional lists generated and stored at the server, according to non-limiting implementations.

DETAILED DESCRIPTION

An aspect of the specification provides a device comprising: a processor and a display, the processor enabled to: provide, at the display, a first graphical representation indicative of a first list and a second graphical representation indicative of a second list, the first list and the second list comprising common elements, and a graphical intersection of the first graphical representation and the second graphical representation is indicative of the common elements; and, separate the graphical intersection from one or more of the first graphical representation and the second graphical representation, such that one or more additional lists are generated based on the separating, each of the one or more additional lists comprising, a respective one of: the common elements; the first list minus the common elements; and, the second list minus the common elements.

The device can further comprise one or more of: a memory storing one or more of the first list and the second list; and, a communication interface enabled to communicate with a server storing one or more of the first list and the second list, wherein generation of the one or more additional lists occurs at the server via exchange of data with the device, the data indicative of one or more of the first list and the second list, and separation of the graphical intersection from one or more of the first graphical representation and the second graphical representation.

The processor can be further enabled to alter the appearance of the first graphical representation to be indicative of the first list minus the common elements, when the graphical intersection is separated there from.

The processor can be further enabled to alter the appearance of the second graphical representation to be indicative of the second list minus the common elements, when the graphical intersection is separated there from.

The processor can be further enabled to alter the appearance of the graphical intersection to be indicative of the common elements, when the graphical intersection is separated there from.

Separating the graphical intersection from one or more of the first graphical representation and the second graphical representation can comprise a visual set operation, and generating one or more additional lists based on the separating can comprise a corresponding set operation.

The processor can be further enabled to identify the common elements of the first list and the second list based on respective fields of elements of each of the first list and the second list.

A size of one or more of the first graphical representation, the second graphical representation and the graphical intersection can be indicative of a respective number of elements in the first list, the second list and the common elements.

Each of the first graphical representation and the second graphical representation can comprise one or more of a Venn diagram, a geometric object, a circle, a square, a triangle and an irregular geometric object.

The first graphical representation, the second graphical representation, and the graphical intersection can be provided at the display in association with one or more of an application input field, a PIM (personal information manager) input field, a messaging application address field, search application input field, a filtering application input field, a contact application input field, a database input field, and a permission management application input field.

The processor can be further enabled to: provide, at the display, textual indications of each of the first list and the second list, with a visual actuator for entering a visual set operation mode; and, provide the first graphical representation indicative and the second graphical representation when actuation input is received indicating visual actuator has been actuated.

Another aspect of the specification provides a method comprising: providing, at a display of a device, a first graphical representation indicative of a first list and a second graphical representation indicative of a second list, the first list and the second list comprising common elements, and a graphical intersection of the first graphical representation and the second graphical representation is indicative of the common elements; and, separating, via a processor of the device, the graphical intersection from one or more of the first graphical representation and the second graphical representation, such that one or more additional lists are generated based on the separating, each of the one or more additional lists comprising a respective one of: the common elements; the first list minus the common elements; and, the second list minus the common elements.

The method can further comprise one or more of: storing one or more of the first list and the second list at a memory of the device; and, communicating, via a communication interface of the device, with a server storing one or more of the first list and the second list, wherein generation of the one or more additional lists occurs at the server via exchange of data with the device, the data indicative of one or more of the first list and the second list, and separation of the graphical intersection from one or more of the first graphical representation and the second graphical representation.

The method can further comprise altering the appearance of the first graphical representation to be indicative of the first list minus the common elements, when the graphical intersection is separated there from.

The method can further comprise altering the appearance of the second graphical representation to be indicative of the second list minus the common elements, when the graphical intersection is separated there from.

The method can further comprise altering the appearance of the graphical intersection to be indicative of the common elements, when the graphical intersection is separated there from.

Separating the graphical intersection from one or more of the first graphical representation and the second graphical representation can comprise a visual set operation, and generating one or more additional lists based on the separating can comprise a corresponding set operation.

The method can further comprise identifying the common elements of the first list and the second list based on respective fields of elements of each of the first list and the second list.

A size of one or more of the first graphical representation, the second graphical representation and the graphical intersection can be indicative of a respective number of elements in the first list, the second list and the common elements.

Each of the first graphical representation and the second graphical representation can comprise one or more of a Venn diagram, a geometric object, a circle, a square, a triangle and an irregular geometric object.

The first graphical representation, the second graphical representation, and the graphical intersection can be provided at the display in association with one or more of an application input field, a PIM (personal information manager) input field, a messaging application address field, search application input field, a filtering application input field, a contact application input field, a database input field, and a permission management application input field.

The method can further comprise: providing, at the display, textual indications of each of the first list and the second list, with a visual actuator for entering a visual set operation mode; and, providing the first graphical representation indicative and the second graphical representation when actuation input is received indicating visual actuator has been actuated.

A further aspect of the specification provides a computer program product, comprising a computer usable medium having a computer readable program code adapted to be executed to implement a method comprising: providing, at a display of a device, a first graphical representation indicative of a first list and a second graphical representation indicative of a second list, the first list and the second list comprising common elements, and a graphical intersection of the first graphical representation and the second graphical representation is indicative of the common elements; and, separating, via a processor of the device, the graphical intersection from one or more of the first graphical representation and the second graphical representation, such that one or more additional lists are generated based on the separating, each of the one or more additional lists comprising a respective one of: the common elements; the first list minus the common elements; and, the second list minus the common elements. The non-transitory computer program product can comprise a non-transitory computer program product.

FIG. 1 depicts a device 101 for performing visual set operations to modify and generate lists, according to non-limiting implementations. Device 101 comprises a processor 120 interconnected with a memory 122, a communications interface 124 (also interchangeably referred to hereafter as interface 124), a display 126 and an input device 128, and optionally a microphone 130 and a speaker 132. In certain non-limiting implementations, device 101 further stores, at memory 122, at least a first list 150-1 and a second list 150-2 will also be referred to hereafter generically as a list 150 and collectively as lists 150. Lists 150 generally comprise common elements: in other words, a subset of elements which are present at first list 150-1 are also present at second list 150-2, as will be described in further detail below. In any event, processor 120 is generally enabled to: provide, at display 126, a first graphical representation indicative of first list 150-1 and a second graphical representation indicative of second list 150-2, first list 150-1 and second list 150-2 comprising common elements, and a graphical intersection of the first graphical representation and the second graphical representation is indicative of the common elements; and, separate the graphical intersection from one or more of the first graphical representation and the second graphical representation, such that one or more additional lists are generated based on the separating, each of the one or more additional lists comprising a respective one of: the common elements; the first list minus the common elements; and, the second list minus the common elements.

Device 101 can be any type of electronic device that can be used in a self-contained manner to perform visual set operations to modify and generate lists. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

It is appreciated that FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony, in other implementations, device 101 can comprise a device enabled for implementing any suitable specialized functions, including but not limited to one or more of telephony, computing, appliance, and/or entertainment related functions.

While in depicted implementations, lists 150 are stored at memory 122, in other implementations; lists 150 can be stored at a server and/or communication device in communication with device 101 via interface 124. For example, see implementations described below with reference to FIG. 11.

Device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. In specific non-limiting implementations described herein, input device 128 comprises a touch screen for receiving touch input data.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores application 160 that, when processed by processor 120, enables processor 120 to: provide, at display 126, a first graphical representation indicative of first list 150-1 and a second graphical representation indicative of second list 150-2, first list 150-1 and second list 150-2 comprising common elements, and a graphical intersection of the first graphical representation and the second graphical representation is indicative of the common elements; and, separate the graphical intersection from one or more of the first graphical representation and the second graphical representation, such that one or more additional lists are generated based on the separating, each of the one or more additional lists comprising a respective one of: the common elements; the first list minus the common elements; and, the second list minus the common elements.

It is yet further appreciated that application 160 is an example of programming instructions stored at memory 122.

Processor 120 in turn can also be configured to communicate with display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, it is appreciated that display 126 and input device 128 can be combined into one apparatus. Microphone 130, when present, comprises any suitable microphone for receiving sound and converting the sound to sound data. Speaker 132, when present, comprises any suitable speaker for providing sound from sound data, audible alerts, audible communications from remote communication devices, and the like, at device 101.

In some implementations, input device 128 and display 126 are external to device 101, with processor 120 in communication with each of input device 128 and display 126 via a suitable connection and/or link.

Processor 120 also connects to interface 124, which can be implemented as one or more radios and/or connectors and/or network adaptors, enabled to wirelessly communicate with one or more communication networks (not depicted). It will be appreciated that interface 124 is enabled to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination. In any event, it is appreciated that any suitable combination of interfaces is within the scope of present implementations.

It is yet further appreciated that device 101 comprises a power source (not depicted), for example a battery or the like. In some implementations the power source can comprise a connection to a mains power supply and a power adaptor (e.g. and AC-to-DC (alternating current to direct current) adaptor).

Further, it should be understood that in general a wide variety of configurations for device 101 are contemplated.

It is further appreciated that lists 150 can be in any suitable format. A non-limiting example of list 150-1 is provided in Table 1:

TABLE 1

| Name | Department | Team | Location | Email Address |
|---|---|---|---|---|
| Tom Jones | Legal | Corporate | Canada | jones@acme.xyz |
| Betty Smith | Legal | Corporate | Canada | smith@acme.xyz |
| David Johnson | Legal | Patent | Canada | johnson@acme.xyz |
| Arnold Perry | Legal | Patent | Sweden | perry@acme.xyz |
| Stephen Last | Legal | Corporate | Sweden | last@acme.xyz |
| Roland Dean | Legal | Corporate | Canada | dean@acme.xyz |
| Eddie King | Legal | Patent | Canada | king@acme.xyz |
| Susan Holmes | Legal | Patent | Sweden | holmes@acme.xyz |

It is appreciated that while Table 1 is arranged in rows and columns, the format of Table 1 could comprise any suitable format, including but not limited to database formats. In any event, each row in Table 1 comprises a record of a different person in a legal department of an entity, with a respective name in the "Name" column, a respective department name in a "Department" column, a respective team name in a "Team" column, a respective location in a "Location" column, and a respective email address in an "Email Address" column.

Further, while not depicted, list 150-1 can be associated with respective name data, such as "Legal", or any other textual data that is descriptive of list 150-1.

Similarly, a non-limiting example of list 150-2 is provided in Table 2:

TABLE 2

| Name | Committee | Department | Location | Email Address |
| --- | --- | --- | --- | --- |
| David Johnson | Patent Committee | Legal | Canada | johnson@acme.xyz |
| Arnold Perry | Patent Committee | Legal | Sweden | perry@acme.xyz |
| Eddie King | Patent Committee | Legal | Canada | king@acme.xyz |
| Susan Holmes | Patent Committee | Legal | Sweden | holmes@acme.xyz |
| Randall Flagg | Patent Committee | Engineering | Sweden | flagg@acme.xyz |
| Edward Canton | Patent Committee | Engineering | Canada | canton@acme.xyz |

It is appreciated that while Table 2 is arranged in rows and columns, the format of Table 2 could comprise any suitable format, including but not limited to database formats. In any event, each row in Table 2 comprises a record of a different person in a patent committee of the entity associated with Table 1, with a respective committee name in the "Committee" column, a respective department name in a "Department" column, a respective location in a "Location" column, and a respective email address in an "Email Address" column.

Further, while not depicted, list 150-2 can be associated with respective name data, such as "Patent", or any other textual data that is descriptive of list 150-2.

It is further appreciated that Table 1 and Table 2 have common elements of: "David Johnson", "Arnold Perry", "Eddie King", and "Susan Holmes". It is appreciated that processor 120 is further enabled to identify the common elements of first list 150-1 and second list 150-2 based on respective fields of elements of each of first list 150-1 and second list 150-2. In other words, processor 120 can compare fields of each of lists 150 to determine common elements of lists 150.

In particular, it is appreciated that while, in the non-limiting example, list 150-1 comprises a list of members of a legal department and list 150-2 comprises a list of members of the patent committee, there is no list of members of the legal department who are not on the patent committee, nor is there a list of members of the patent committee who are not in the legal department. When it is desired to email members of the legal department who are not on the patent committee, and/or members of the patent committee who are not in the legal department, lists 150 must be manually edited to generate such lists and/or addresses for each member of the legal department who is not on the patent committee, and/or each members of the patent committee who is not in the legal department must be individually selected; both approaches are time consuming and generally wasteful of computing resources.

Hence, attention is now directed to FIG. 2 which depicts a flowchart of a method 200 for performing visual set operations to modify and generate lists, according to non-limiting implementations. In order to assist in the explanation of method 200, it will be assumed that method 200 is performed using device 101. Furthermore, the following discussion of method 200 will lead to a further understanding of device 101 and its various components. However, it is to be understood that device 101 and/or method 200 can be varied, and need not work exactly as discussed herein in conjunction with each other, and that such variations are within the scope of present implementations.

It is appreciated that, in some implementations, method 200 is implemented by processor 120 of device 101. Indeed, method 200 is one way in which device 101 can be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of device 101 as well.

At block 201, processor 120 provides, at display 126, a first graphical representation indicative of first list 150-1 and a second graphical representation indicative of second list 150-2, first list 150-1 and second list 150-2 comprising common elements, and a graphical intersection of the first graphical representation and the second graphical representation indicative of the common elements. At block 203, processor 120 separates the graphical intersection from one or more of the first graphical representation and the second graphical representation. In response to block 203, at block 205, one or more additional lists are generated based on the separating, each of the one or more additional lists comprising a respective one of: the common elements; first list 150-1 minus the common elements; and, second list 150-2 minus the common elements. One or more of the additional lists can be generated by processor 120 and stored at memory 122. Alternatively, one or lists 150 can be stored at a server, and the like, one or more of the additional lists can be generated at the server, device 101 and the server exchanging data indicative of separation of the graphical intersection from one or more of the first graphical representation and the second graphical representation, as described below with reference to FIG. 11.

A non-limiting example of method 200 will now be described with reference to FIG. 3, which depicts front perspective views 3-I, 3-II, 3-III, 3-IV and 3-V provided at display 126 of device 101, in a sequence, according to non-limiting implementations. In the non-limiting example of FIGS. 3, it is assumed that input device 128 and/or display 126 comprises at least a touch screen device. Hence, implementations will be described with reference to touch input and touch screen events. However, it is appreciated that, in other implementations, other input devices can be used to assist with method 200.

It is further appreciated that each view 3-I, 3-II, 3-III, 3-IV and 3-V each depict graphic user interfaces (GUIs) associated with a messaging application processed by processor in conjunction with application 160.

For example, view 3-I depicts a GUI of a messaging application for composing an e-mail, including an address field 301, a subject field 303 and text field 305 for receiving text forming the body of the email. It is appreciated that, in view 3-I, an email has been composed by receiving input into each of fields 301, 303, 305. In particular, in address field 301, an indication of each of lists 150-1 has been received. For example, each of lists 150 can be selected via field 301 (e.g. via interactive pulldown menus, browser windows, and the like) such that the e-mail of view 3-I is initially addressed to all email addresses of each of lists 150; some email addresses common to both lists 150 will hence appear twice.

Specifically, in these example implementations, processor 120 provides, at display 126, textual indications of each of first list 150-1 (i.e. "Legal (8)", which comprises the name data associated with list 150-1, as well as a number of elements in list 150-1) and second list 150-2 (i.e. "Patent (6)", which comprises the name data associated with list 150-2, as well as a number of elements in list 150-2). Further, while the number of elements in each list 150 is provided in each textual indication, it is appreciated that the number of elements are optional. Furthermore, the textual indications are provided with a visual actuator 310 for entering a visual set operation mode, as will be presently described.

When visual actuator 310 is actuated, device 101 enters a visual set operation mode: block 201 is implemented by processor 120, and processor 120 provides, at display 126, a first graphical representation 311 indicative of first list 150-1, and a second graphical representation 312 indicative of second list 150-2, a graphical intersection 313 of first graphical representation 311 and second graphical representation 312 indicative of the common elements. It is further appreciated that field 301 is increased in size (as compared to view 3-I) to show first graphical representation 311, second graphical representation 312 and graphical intersection 313, at the expense of a size of field 303 and/or field 305; to access text in fields 303, 305 that are pushed off-screen, any suitable scrolling action, and the like, can be used.

While each of first graphical representation 311 and second graphical representation 312 is depicted in view 3-II as a circle, in other implementations, each of first graphical representation 311 and second graphical representation 312 can comprise one or more of a geometric object, a circle, a square, a triangle, and the like. Indeed, irregular geometric objects are also within the scope of present implementations.

It is yet further appreciated that first graphical representation 311, second graphical representation 312 and graphical intersection 313 together comprise a Venn diagram, with first graphical representation 311 representing the set of elements in first list 150-1, second graphical representation 312 representing the set of elements in second list 150-2 and graphical intersection 313 representing the common elements of first list 150-1 and second list 150-2.

Hence, first graphical representation 311, second graphical representation 312 and graphical intersection 313 are graphical representations of sets represented by lists 150, and further, as described below, visual set operations can be performed on first graphical representation 311, second graphical representation 312 and graphical intersection 313 that cause generation of one or more additional lists that reflect the changes made to first graphical representation 311, second graphical representation 312 and graphical intersection 313 in the visual set operation.

In some implementations, a size of one or more of first graphical representation 311, second graphical representation 312 and graphical intersection 313 is indicative of a respective number of elements in first list 150-1, second list 150-2 and the common elements. Hence, in these implementations, the larger the number of elements of first list 150-1, the larger is first graphical representation 311, the larger the number of elements of second list 150-2, the larger is second graphical representation 312, and the larger the number of common elements, the larger is graphical intersection 313. However, depending on a size of display 126 and/or a number of elements of lists 150, a proportional representation of size may not occur; for example, when a number of elements of first list 150-1 is hundreds or thousands, and a number of elements of second list 150-2 is tens, proportional representation could render first graphical representation 311, second graphical representation 312 and graphical intersection 313 challenging to view and/or display at display 126. Hence, in processor 120 can be enabled to control respective sizes of each of first graphical representation 311, second graphical representation 312 and graphical intersection 313 to one or more of a minimum size and a maximum size.

In any event, view 3-II further depicts an arrow 315 starting at graphical intersection 313 and pointing outside of first graphical representation 311, second graphical representation 312 and graphical intersection 313. Arrow 315 is indicative of input received at one or more of a touch screen of display 126 and/or input device 128, indicating a selection of graphical intersection 313 at display 126 and "dragging" graphical intersection 313 away from first graphical representation 311 and second graphical representation 312. For example, a touch event could be initially detected at graphical intersection 313, the touch event following arrow 315, causing graphical intersection 313 to be "dragged" and/or separated out of first graphical representation 311 and second graphical representation 312.

In any event, in response to the dragging, or the like, view 3-III is generated, in which processor 120 separates graphical intersection 313 from first graphical representation 311 and second graphical representation 312 (i.e. block 203). Further, processor 120 alters the appearance of first graphical representation 311 to be indicative of first list 150-1 minus the common elements, when graphical intersection 313 is separated there from. In other words, processor 120 changes the appearance of first graphical representations 311 to altered first graphical representation 311', which comprises a circle of a smaller radius and/or smaller area than first graphical representation 311 thereby indicating that the number of associated elements has decreased (e.g. from eight elements to four elements).

Similarly, processor 120 alters the appearance of second graphical representation 312 to be indicative of second list 150-2 minus the common elements, when the graphical intersection 313 is separated there from. In other words, processor 120 changes the appearance of second graphical representation 312 to altered second graphical representation 312', which comprises a circle of a smaller radius and/or smaller area than second graphical representation 312 thereby indicating that the number of associated elements has decreased (e.g. from six elements to four elements).

Similarly, processor 120 alters the appearance of graphical intersection 313 to be indicative of the common elements, when graphical intersection 313 is separated. In other words, processor 120 changes the appearance of graphical intersection 313 to third graphical representation 313'. In this instance, the appearance of graphical intersection 313 is changed from the intersection of two circles to a circle (i.e. graphical representation 313'). Further, graphical representation 313' is labelled with a textual indicator ("Legal+Patent") that is indicative of graphical representation 313' being an intersection of common elements of "Legal" first list 150-1 and "Patent" second list 150-2.

Textual indicators for each of altered first graphical representation 311' and altered second graphical representation 312' each comprise a similar textual indication indicative of an underlying set and/or list: for example, a textual indicator of first graphical representation 311' comprises "Legal−Patent (4)" (i.e. legal minus patent) and a textual indicator of first graphical representation 311' can comprise "Patent−Legal (2)" (i.e. patent minus legal). Further, the textual indicators are also indicative of a number of elements of a corresponding generated list, as described hereafter.

Figure 4:
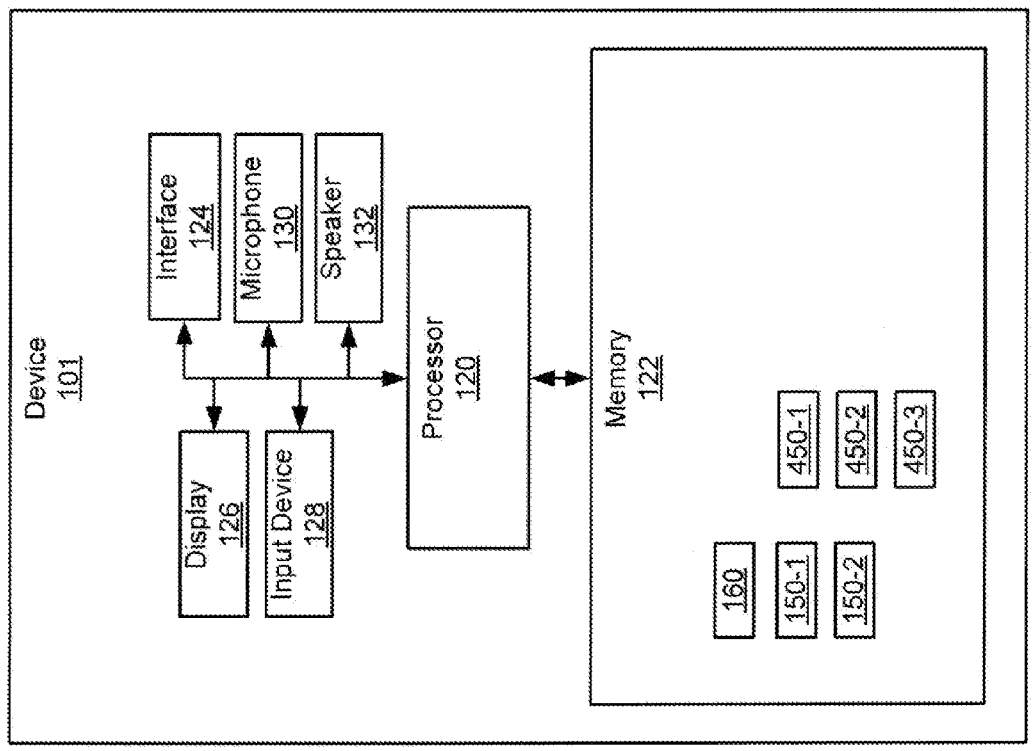
FIG. 4 depicts the device of FIG. 1, with lists generated via the method of FIG. 2, stored therein, according to non-limiting implementations.

For example, with reference to FIG. 4, which is substantially similar to FIG. 1, with like elements having like numbers, three new lists 450-1, 450-2, 450-3 (referred to collectively as lists 450, and generically as a list 450) are generated (block 205), list 450-1 comprising list 150-1 minus the common elements, list 450-2 comprising list 150-2 minus the common elements and list 450-3 comprising the common elements.

Starting with the non-limiting example of first list 150-1 provided in Table 1, the contents of list 450-1 can comprise Table 3:

TABLE 3

| Name | Department | Team | Location | Email Address |
|---|---|---|---|---|
| Tom Jones | Legal | Corporate | Canada | jones@acme.xyz |
| Betty Smith | Legal | Corporate | Canada | smith@acme.xyz |
| Stephen Last | Legal | Corporate | Sweden | last@acme.xyz |
| Roland Dean | Legal | Corporate | Canada | dean@acme.xyz |

It is appreciated that while Table 3 has a similar format to Table 1, the format of Table 3 could comprise any suitable format. In any event, it is appreciated that Table 3 is similar to Table 1, but minus the common elements of Table 1 and Table 2: in other words, common elements of: "David Johnson", "Arnold Perry", "Eddie King", and "Susan Holmes" are absent from Table 3.

Similarly, starting with the non-limiting example of second list 150-2 provided in Table 2, the contents of list 450-2 can comprise Table 4:

TABLE 4

| Name | Committee | Department | Location | Email Address |
|---|---|---|---|---|
| Randall Flagg | Patent Committee | Engineering | Sweden | flagg@acme.xyz |
| Edward Canton | Patent Committee | Engineering | Canada | canton@acme.xyz |

It is appreciated that while Table 4 has a similar format to Table 2, the format of Table 4 could comprise any suitable format. In any event, it is appreciated that Table 4 is similar to Table 2, but minus the common, elements of Table 1 and Table 2: in other words, common elements of "David Johnson", "Arnold Perry", "Eddie King", and "Susan Holmes" are absent from Table 4.

It is further appreciated that list 450-3 comprises the common elements, hence starting with the non-limiting example of first list 150-1 provided in Table 1 and second list 150-2 provided in Table 2, the contents of list 450-3 can comprise Table 5:

TABLE 5

| Name | Department | Team | Location | Email Address |
|---|---|---|---|---|
| David Johnson | Legal | Patent | Canada | johnson@acme.xyz |
| Arnold Perry | Legal | Patent | Sweden | perry@acme.xyz |
| Eddie King | Legal | Patent | Canada | king@acme.xyz |
| Susan Holmes | Legal | Patent | Sweden | holmes@acme.xyz |

It is appreciated that while Table 5 has a similar format to Table 1, the format of Table 4 could comprise any suitable format, including, but not limited to, the format of Table 2. In any event, Table 5 comprises the elements common to Tables 1 and 2. In other implementations, only the names and email addresses of the common elements can be provided in list 450-3.

It is further appreciated, that lists 450 are generated and stored in memory 122.

Returning to FIG. 3, it is appreciated that altered first graphical representation 311' is indicative of list 450-1, altered second graphical representation 312' is indicative of list 450-2, and third graphical representation 313' is indicative of list 450-3. There is no depicted intersection of altered first graphical representation 311', altered second graphical representation 312', and third graphical representation 313' as the common elements have been removed from each of lists 450-1, 450-2 and placed into list 450-3.

Furthermore, a number of elements of each corresponding list 450 are provided with textual indicators of each corresponding altered first graphical representation 311', altered second graphical representation 312' and third graphical representation 313'.

Each of altered first graphical representation 311', altered second graphical representation 312', and third graphical representation 313' is provided with a respective actuator 340, each of which, when actuated, causes the respective altered first graphical representation 311', altered second graphical representation 312', and/or third graphical representation 313' to be removed from display 126.

Figure 5:
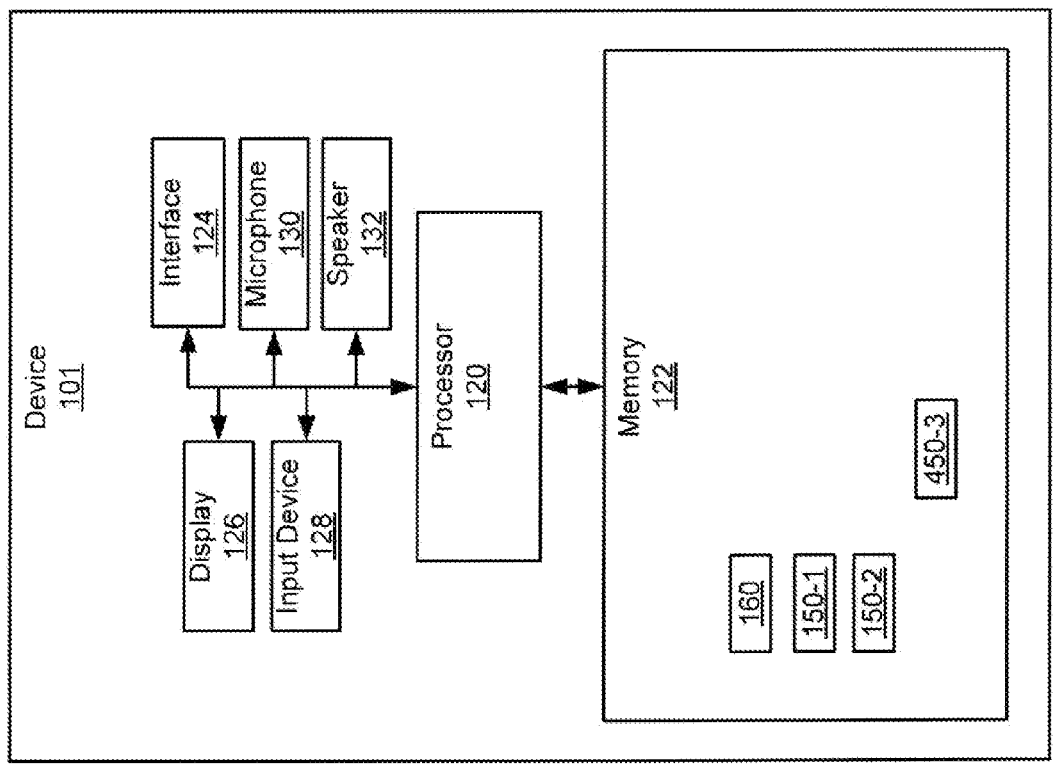
FIG. 5 depicts the device of FIG. 1, with a list generated via the method of FIG. 2, stored therein, according to non-limiting implementations.

For example, in view 3-IV, it is assumed that actuators 340 associated with each of altered first graphical representation 311' and altered second graphical representation 312' have been actuated, for example via a touch screen of display 126 and/or input device 128. Hence in view 3-IV only third graphical representation 313' remains (the respective actuator 340 can be removed or not, as desired). In other words, graphical representations associated with actuated actuators 340 are deleted at display 126, and further with reference to FIG. 5 (substantially similar to FIG. 4, with like elements having like numbers), lists 450-1, 450-2 corresponding to deleted altered first graphical representation 311', and deleted altered second graphical representation 312' are also deleted at memory 122.

Hence, separating graphical intersection 313 from one or more of first graphical representation 311 and second graphical representation 312 comprises a visual set operation, and generating one or more additional lists 450 based on the separating comprises a corresponding set operation. The set operation can include, but is not limited to, deleting lists 450 respective to deleted graphical representations of the one or more additional lists.

Figure 3:
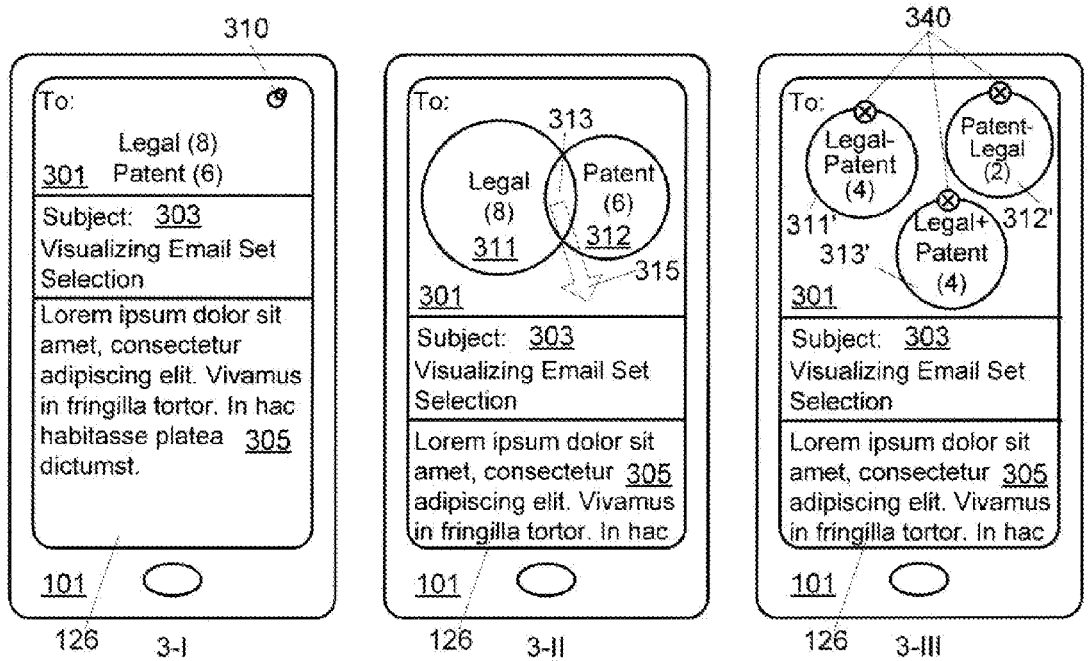
FIG. 3 depicts a sequence of graphical user interfaces provided at the device of FIG. 1, when performing visual set operations to modify and generate lists, according to non-limiting implementations.

With further reference to FIG. 3, at view 3-V, processor 120 causes device 101 to return to a textual indication mode in field 301, for example via one or more of actuation of graphical representation 313', another actuator (not depicted) for switching back to a textual mode, a pulldown menu, and the like. In any event, at view 3-V, field 301 comprises a textual indicator of list 450-3, the textual indicator indicative of the set operation that has occurred to produce list 450-3, in this instance "Legal AND Patent (4)": in other words, field 301 is now populated with a list comprising email addresses of members of an entity who are both in the legal department AND on the patent committee.

The email of FIG. 3 can be transmitted via view 3-IV or view 3-V, the email being transmitted to devices associated with email addresses of all elements of list 450-3. The email can be transmitted via actuation of a send button, or the like (not depicted).

While present implementations have been described with respect to first graphical representation 311, second graphical representation 312, and graphical intersection 313 provided at display 126 in association with a messaging application, method 200 could be implemented in association with an input field of an application, including, but not limited to, one or more of a PIM (personal information manager) input field, a messaging application address field, a contact application input field, a search application input field, a filter application input field, a database input field, a permission management application input field and any other application where efficient set operations on sets is desired.

Furthermore, elements of lists 150 are not limited to email addresses, name records and the like; rather method 200 can be applied to lists of any type where there are common elements of lists and it is desired to generate additional lists to separate out the common elements and/or remove the common elements from the existing lists.

Furthermore, in other implementations, one of lists 150 can comprise the other of lists 150. For example, attention is next directed to FIG. 6, which is substantially similar to FIG. 3, with like elements having like numbers and hence depicts front perspective views 6-I, 6-II, 6-III, 6-IV and 6-V provided at display 126 of device 101, in a sequence, according to non-limiting implementations.

Figure 7:
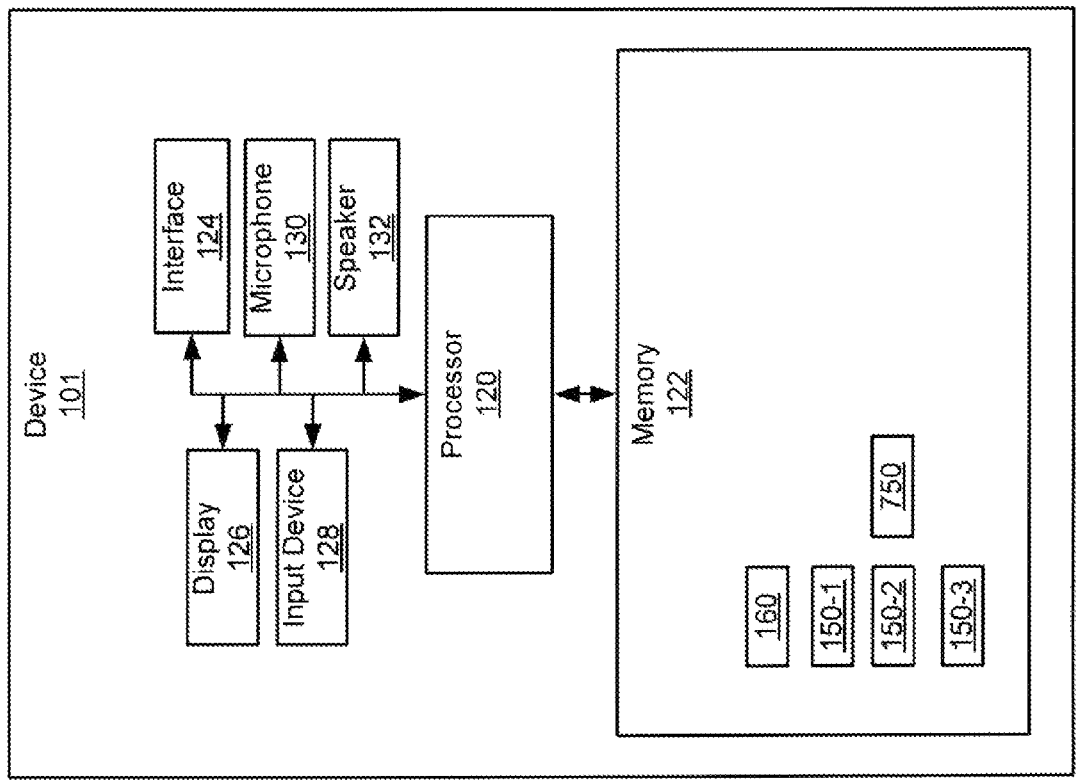
FIG. 7 depicts the device of FIG. 1, with a list generated via the method of FIG. 2, stored therein, according to non-limiting implementations.

It is further appreciated that, with reference to FIG. 7, in these implementations device 101 stores list 150-1, list 150-2, as described above, and list 150-3 comprising, in a non-limiting example, the contents of Table 6:

TABLE 6

| Name | Department | Team | Location | Email Address |
|---|---|---|---|---|
| Arnold Perry | Legal | Patent | Sweden | perry@acme.xyz |
| Stephen Last | Legal | Corporate | Sweden | last@acme.xyz |
| Susan Holmes | Legal | Patent | Sweden | holmes@acme.xyz |

It is appreciated that while Table 6 has a similar format to Table 1, the format of Table 6 could comprise any suitable format. In any event, it is appreciated that Table 6 is similar to Table 1, but comprises only names of members of the legal department (of the entity associated with Table 1) that are located in Sweden. List 150-3 can also be associated with a name indicator, such as "Legal:Sweden", which is provided in field 301, along with a number of elements of list 150-3 (e.g. "Legal:Sweden (3)").

In any event, at view 6-I, lists 150-1, 150-3 have been selected, as described above. Upon actuation of actuator 310 at view 6-I, device 101 enters a visual set operation mode, and at view 6-II, a first graphical representation 611 of list 150-1 is provided as is a second graphical representation 612 of list 150-3, at display 126.

However, in these implementations, as list 150-1 subsumes list 150-3, first graphical representation 611 contains second graphical representation 612; in other words a graphical intersection of first graphical representation 611 and second graphical representation 612 comprises second graphical representation 612.

A graphical intersection of first graphical representation 611 and second graphical representation 612 comprises second graphical representation 612, which can be separated from graphical representation 611 via a "drag" operation as indicated by arrow 615, as described above. Hence, at view 6-III, processor 120 provides, at display 126, an altered graphical representation 611' of first graphical representation 611, altered graphical representation 611' indicative of list 150-1 minus elements of list 150-3. For example, in response to separating the graphical intersection from first graphical representation 611, with reference to FIG. 7 (substantially similar to FIG. 1, with like elements having like numbers), processor 120 generates a list 750 comprising (starting with the non-limiting example of first list 150-1 provided in Table 1), Table 7:

TABLE 7

| Name | Department | Team | Location | Email Address |
|---|---|---|---|---|
| Tom Jones | Legal | Corporate | Canada | jones@acme.xyz |
| Betty Smith | Legal | Corporate | Canada | smith@acme.xyz |
| David Johnson | Legal | Patent | Canada | johnson@acme.xyz |
| Roland Dean | Legal | Corporate | Canada | dean@acme.xyz |
| Eddie King | Legal | Patent | Canada | king@acme.xyz |

It is appreciated that while Table 7 has a similar format to Table 1, the format of Table 7 could comprise any suitable format. In any event, it is appreciated that Table 7 is similar to Table 1, but minus the common elements of Table 1 and Table 6: in other words, common elements of: "Arnold Perry", "Stephen Last", and "Susan Holmes" are absent from Table 7. In other words, list 750 comprises member of the legal department who are not located in Sweden.

In any event, returning to FIG. 6, altered graphical representation 611' is identified by a textual identifier of the set operation that occurred: in other words, textual identifier "Legal—Sweden (5)" indicates that the corresponding list 750 comprises members of the legal department minus Swedish members of the legal department (and a number of elements, "5", in list 750).

At view 6-IV it is assumed that actuator 340 associated with second graphical representation 612 has been actuated at view 6-III, and hence second graphical representation 612 has been deleted from display 126. In these implementations, however, corresponding list 150-3 is not deleted from memory 122. Indeed, in some implementations processor 120 only deletes lists corresponding to a deleted graphical representation that are generated at block 205. However, in other implementations, no lists generated at block 205 are deleted. In yet further implementations, only a subset of lists generated at block 205 are deleted, for example based on one or more of a size of a list and the like; indeed, any suitable criteria could be used by processor 120 in deciding when to delete a list generated at block 205.

At view 6-V, similar to view 3-V, field 301 is populated by a textual indicator "Legal Minus Sweden (5)", indicative that the corresponding list 750 comprises members of the legal department minus members of the legal department located in Sweden (and a number of elements, "5", in list 750).

Figure 6:
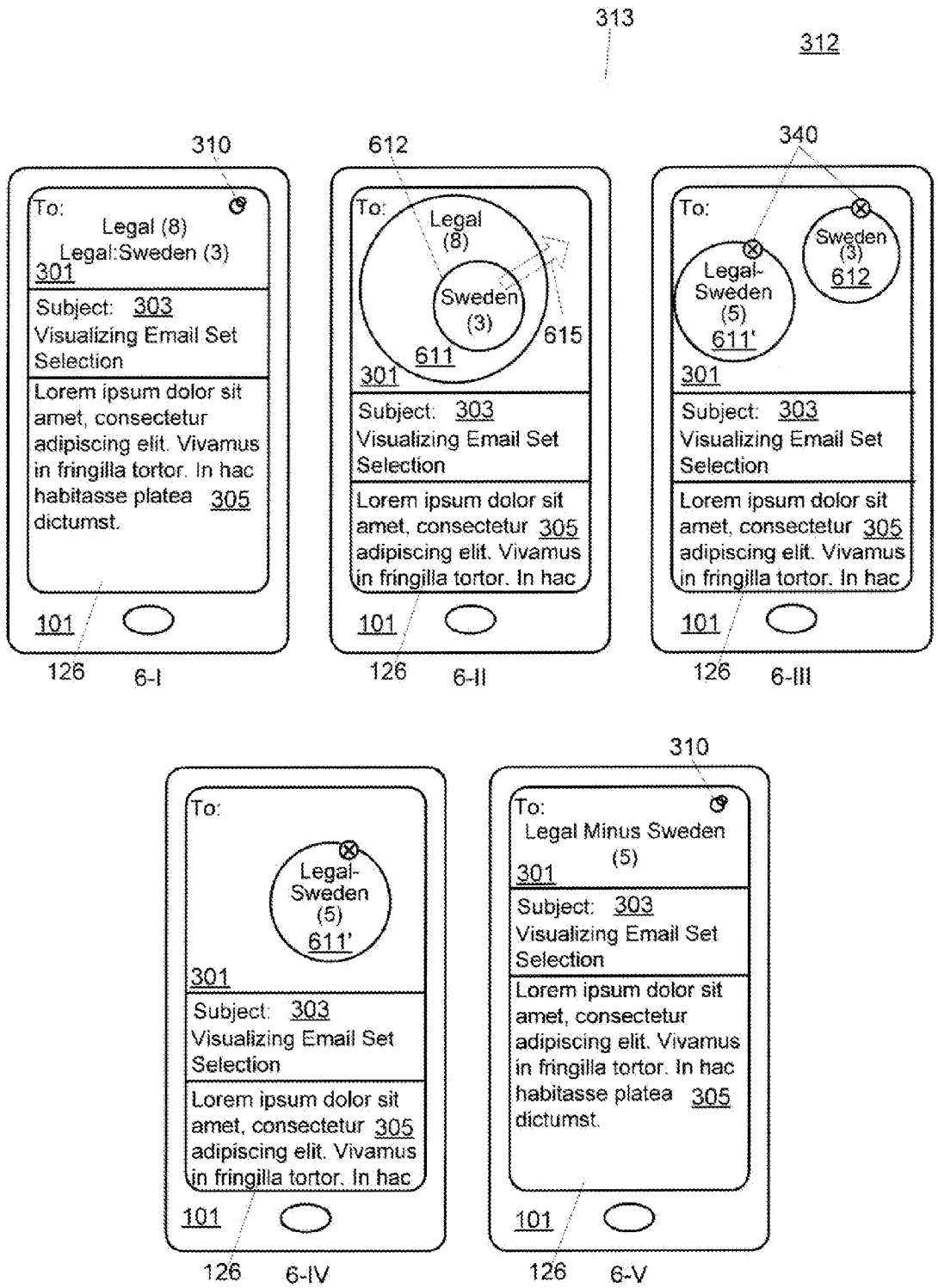
FIG. 6 depicts a sequence of graphical user interfaces provided at the device of FIG. 1, when performing visual set operations to modify and generate lists, according to non-limiting implementations.

The email of FIG. 6 can be transmitted via view 6-IV or view 6-V, the email being transmitted to devices associated with email addresses of all elements of list 750. The email can be transmitted via actuation of a send button, or the like (not depicted).

Persons skilled in the art will appreciate that there are yet more alternative implementations and modifications possible. For example, method 200 can be applied to more than two lists, and more than two corresponding graphical representations thereof. By way of example, attention is next directed to FIGS. 8 and 9 which, together, are substantially similar to FIG. 3, with like elements having like numbers and hence depicts front perspective views 8-I, 8-II, 8-III, 8-IV, 8-V, and 8-VI provided at display 126 of device 101, in a sequence, according to non-limiting implementations.

It is further assumed in these implementations that memory 122 stores list 150-1, list 150-2 and list 150-3, as described above, and as further depicted in FIG. 10 (substantially similar to FIG. 1, with like elements having like numbers).

In any event, at view 8-I, lists 150-1, 150-2, and 150-3 have been selected: in other words, three lists 150 are selected, rather than the two lists 150 of the examples provided in FIGS. 3 and 6. Upon actuation of actuator 310 at view 8-I, at view 8-II, a first graphical representation 811 of list 150-1 is provided, as is a second graphical representation 812 of list 150-2, and a third graphical representation of list 150-3, at display 126.

In these implementations, as list 150-1 subsumes list 150-3, first graphical representation 811 contains second graphical representation 812; in other words a graphical intersection of first graphical representation 811 and second graphical representation 812 comprises second graphical representation 812. Further, a graphical intersection 814 of first graphical representation 811 and second graphical representation 812 is provided. It is further appreciated that graphical intersection 814 is also indicative of a graphical intersection of third graphical representation 813 and second graphical representation 812 is provided. Graphical intersection 814 is further indicative of common elements of associated lists 150, as described above.

Third graphical representation 813 (which is also indicative of a graphical intersection of first graphical intersection 811 and third graphical representation 813) can be separated from first graphical representation 811 via a "drag" operation as indicated by arrow 815, as described above.

Hence, at view 8-III, processor 120 provides, at display 126, an altered graphical representation 811' of first graphical representation 811, altered graphical representation 811' indicative of list 150-1 minus elements of list 150-3, with a textual indicator thereof (i.e. "Legal−Sweden (5)").

Further, processor 120 provides, at display 126, an altered graphical representation 813' of third graphical representation 813, altered graphical representation 813' indicative of list 150-3, but with an updated textual indicator (i.e. "Legal+Sweden (3)"), indicating that elements of list 150-3 are also elements of list 150-1. Second graphical representation 812 is unchanged. While not depicted, it is further appreciated that a list corresponding to altered first representation 811' can be generated and stored at memory 122, as described above; such a list can be stored until further visual set operations are performed, as will be presently described.

Respective drag operations on a graphical intersection 816 of altered first representation 811' and second graphical representation 812, and on a graphical intersection 817 of altered third representation 813' and second graphical representation 812 are respectively indicated by arrows 816, 817, the drag operations similar to those described above.

In any event, once the drag operations are performed, processor 120 generates view 8-IV of FIG. 9, comprising further altered first representation 811", altered second representation 812', further altered third representation 813", graphical representation 816' (derived from graphical intersection 816), and graphical representation 817' (derived from graphical intersection 817). Further, lists 1050-1, 1050-2, 1050-3, 1050-4, 1050-5 depicted in FIG. 10 (substantially similar to FIG. 1, with like elements having like numbers), are generated and stored in memory 122, as will presently be described. Lists 1050-1, 1050-2, 1050-3, 1050-4, 1050-5 will interchangeably be referred to collectively as lists 1050, and generically as a list 1050.

In response to separating graphical intersection 816 from altered first graphical representation 811' and graphical representation 812, processor 120 generates further altered first representation 811" and corresponding list 1050-1 comprising (starting with the non-limiting example of first list 150-1 provided in Table 1) Table 8:

TABLE 8

| Name | Department | Team | Location | Email Address |
|---|---|---|---|---|
| Tom Jones | Legal | Corporate | Canada | jones@acme.xyz |
| Betty Smith | Legal | Corporate | Canada | smith@acme.xyz |
| Roland Dean | Legal | Corporate | Canada | dean@acme.xyz |

It is appreciated that while Table 8 has a similar format to Table 1, the format of Table 8 could comprise any suitable format. In any event, it is appreciated that Table 8 is similar to Table 1, but minus the common elements of Table 1 and Table 2, and minus the common elements of Table 1 and Table 6. In other words, list 1050-1 comprises members of the legal department who are not located in Sweden and who are not on the patent committee.

Further altered first graphical representation 811" is identified by a textual identifier of the set operation that occurred: in other words, textual identifier "Legal−Sweden−Patent (3)" indicates that the corresponding list 1050-1 comprises members of the legal department minus Swedish members of the legal department minus patent committee members, (and a number of elements, "3", in list 1050-1).

In further response to separating graphical intersection 816 from altered first graphical representation 811' and graphical representation 812, processor 120 generates graphical representation 816' and further generates corresponding list 1050-2 comprising (starting with the non-limiting example of first list 150-1 provided in Table 1) Table 9:

TABLE 9

| Name | Department | Team | Location | Email Address |
|---|---|---|---|---|
| David Johnson | Legal | Patent | Canada | johnson@acme.xyz |
| Eddie King | Legal | Patent | Canada | king@acme.xyz |

It is appreciated that while Table 9 has a similar format to Table 1, the format of Table 9 could comprise any suitable format. In any event, it is appreciated that Table 9 comprises the common elements of Table 1 and Table 2, minus common elements of Tables 1 and 3. In other words, list 1050-2 comprises members of the legal department who are not located in Sweden and who are on the patent committee.

Further graphical representation 816' is identified by a textual identifier of the set operation that occurred: in other words, textual identifier "Legal+Patent−Sweden (2)" indicates that the corresponding list 1050-2 comprises members of the legal department who are on the patent committee minus members of the legal department located in Sweden (and a number of elements, "2", in list 1050-2).

In response to separating graphical intersections 816, 817 from second graphical representation 812 and altered third graphical representation 813', processor 120 generates graphical representation 812' and further generates corresponding list 1050-3 comprising (starting with the non-limiting example of second list 150-2 provided in Table 2) Table 10:

TABLE 10

| Name | Committee | Department | Location | Email Address |
|---|---|---|---|---|
| Randall Flagg | Patent Committee | Engineering | Sweden | flagg@acme.xyz |
| Edward Canton | Patent Committee | Engineering | Canada | canton@acme.xyz |

It is appreciated that while Table 10 has a similar format to Table 2, the format of Table 10 could comprise any suitable format. In any event, it is appreciated that Table 10 comprises elements of Table 2 minus the common elements of Tables 1 and 2. In other words, list 1050-3 comprises members of the patent committee who are not in the legal department.

Further graphical representation 812' is identified by a textual identifier of the set operation that occurred: in other words, textual identifier "Patent−Legal (2)" indicates that the corresponding list 1050-3 comprises members of the patent committee minus members of the legal department (and a number of elements, "2", in list 1050-3).

In further response to separating graphical intersections 816, 817 from second graphical representation 812 and altered third graphical representation 813', processor 120 generates further third graphical representation 813" and further generates corresponding list 1050-4 comprising (starting with the non-limiting example of first list 150-1 provided in Table 1) Table 11:

TABLE 11

| Name | Department | Team | Location | Email Address |
|---|---|---|---|---|
| Stephen Last | Legal | Corporate | Sweden | last@acme.xyz |

It is appreciated that while Table 11 has a similar format to Table 1, the format of Table 11 could comprise any suitable format. In any event, it is appreciated that Table 11 comprises elements of Table 1 without common elements of Tables 1 and 2, and Tables 1 and 3. In other words, list 1050-4 comprises members of the legal department who are in Sweden and not on the patent committee.

Further third graphical representation 813" is identified by a textual identifier of the set operation that occurred; in other words, textual identifier "Legal+Sweden−Patent (1)" indicates that the corresponding list 1050-4 comprises members of the legal department located in Sweden who are not members of the patent committee (and a number of elements, "1", in list 1050-4).

In yet further response to separating graphical intersections 816, 817 from second graphical representation 812 and altered third graphical representation 813', processor 120 generates graphical representation 817' and further generates corresponding list 1050-5 comprising (starting with the non-limiting example of first list 150-1 provided in Table 1) Table 12:

TABLE 12

| Name | Department | Team | Location | Email Address |
|---|---|---|---|---|
| Arnold Perry | Legal | Patent | Sweden | perry@acme.xyz |
| Susan Holmes | Legal | Patent | Sweden | holmes@acme.xyz |

It is appreciated that while Table 12 has a similar format to Table 1, the format of Table 12 could comprise any suitable format. In any event, it is appreciated that Table 12 comprises common elements of Tables 1, 2, and 3. In other words, list 1050-5 comprises members of the legal department who are in Sweden and on the patent committee.

Further graphical representation 817' is identified by a textual identifier of the set operation that occurred: in other words, textual identifier "Legal+Sweden+Patent (2)" indicates that the corresponding list 1050-5 comprises members of the legal department located in Sweden who are members of the patent committee (and a number of elements, "2", in list 1050-5).

In any event, one or more of graphical representations 811", 812', 813", 816', 817', (and optionally corresponding lists 1050) can be deleted via respective actuators 340.

At view 8-V it is assumed that actuators 340 associated with graphical representations 811", 812', 813", 816' have been deleted at view 8-IV, leaving only graphical representation 817' at display 126.

At view 8-VI, similar to view 3-V, field 301 is populated by a textual indicator "Legal AND Sweden AND Patent (2)", indicative that the corresponding list 1050-5 comprises members of the legal department who are located in Sweden and on the patent committee (and a number of elements, "2", in list 1050-5).

The email of FIGS. 8 and 9 can be transmitted via view 8-V or view 8-VI, the email being transmitted to devices associated with email addresses of all elements of list 1050-5. The email can be transmitted via actuation of a send button, or the like (not depicted).

Attention is next directed to FIG. 11, which depicts a system 1100 for performing visual set operations to modify and generate lists, according to non-limiting implementations. System 1100 comprises a device 101a that is substantially similar to device 101, with like elements having like numbers, however with an "a" appended thereto. For example, processor 120a is substantially similar to processor 120. Hence, device 101a comprises: processor 120a interconnected with a memory 122a, a communications interface 124a (also interchangeably referred to hereafter as interface 124a), a display 126a and an input device 128a, and optionally a microphone 130a and a speaker 132a. Memory 122a further stores an application 160a similar to application 160.

System 1100 further comprises a server 1103 in communication with device 101a via a communications network 1105, and links 1140, 1141. Server 1103 generally comprises a processor 1170 interconnected with a memory 1172 and a communications interface 1174 (also interchangeably referred to hereafter as interface 1174). Server 1103 further stores at memory 1172, lists 150a-1, 150a-2 (also interchangeably referred to hereafter collectively as lists 150a and generically as a list 150a), which are substantially similar to lists 150. In other words, in these implementations, lists 150a are stored at server 1103 rather than at device 101a.

In general, it will be appreciated that interface 124a is configured to correspond with the network architecture that is used to implement link 1140, and interface 1174 is configured to correspond with the network architecture that is used to implement link 1141, links 1140, 1141 described below.

Server 1103 can otherwise be based on any well-known server environment including a module that houses one or more central processing units (i.e. processor 1170 comprises one or more central processing units), volatile memory (e.g. random access memory), persistent memory (e.g. hard disk devices) (i.e. memory 1172 comprises volatile memory and persistent memory) and network interfaces (i.e. interface 1174 comprises one or more network interfaces) to allow server 1103 to communicate over link 11411. For example, server 1103 can comprise a Sun Fire 8800 series server running a UNIX operating system, from Oracle Corporation, Inc. of Santa Clara Calif., and having eight central processing units each operating at about three thousand megahertz and having more than sixteen gigabytes of random access memory. However, it is to be emphasized that this particular server is merely exemplary, and a vast array of other types of computing environments for server 1103 are contemplated. It is further more appreciated that server 1103 can comprise any suitable number of servers that can perform different functionality of server implementations described herein.

Link 1140 comprises any suitable link for enabling device 103a to communicate with network 1105. Similarly, link 1141 comprises any suitable link for enabling server 1103 to communicate with network 1105. Links 1140, 1141 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

In any event, in these implementations, method 200 is implemented at device 101a via processor 120a processing application 160a. However, to generate a first graphical representation indicative of list 150a-1, a second graphical representation indicative of second list 150a-2, and a graphical intersection of the first graphical representation and the second graphical representation indicative of the common elements at block 201, device 101 transmits a request 1501 to server 1103 for an indication of lists 150a. Server 1103 responds by transmitting an indication 1503 of lists 150a to device 101a, indication 1503 comprising data that enables processor 120a to generate the first graphical representation indicative of list 150a-1, the second graphical representation indicative of second list 150a-2, and the graphical intersection indicative of the common elements. For example, processor 1170, upon receiving request 1501 can compare lists 150a to determine a number of respective elements in each and a number of common elements, which can be transmitted in indication 1503. When block 203 occurs, device 101a can transmit an indication 1505 of the separation the graphical intersection from one or more of the first graphical representation and the second graphical representation to server 1103, where processor 1170 can, in turn generate one or more additional lists 2450, similar to lists 450, as depicted in FIG. 12, which is substantially similar to FIG. 11, with like elements having like numbers.

In other words, generation of one or more additional lists 2450 occurs at server 1103 via exchange of data (e.g. request 1501, indications 1503, 1505) with device 101a, the data indicative of one more of lists 150a, and separation of the graphical intersection from one or more of the first graphical representation and the second graphical representation.

When server 1103 comprises three or more lists (e.g. similar to device 101 of FIG. 7) exchange of further data between device 101a and server 1103 can occur to generate additional lists and/or generate graphical representations and/or graphical intersections of the list as per FIGS. 8 to 10.

In any event, by using visual set operations as described herein, lists can be efficiently modified and/or generated, providing to convenient means for performing set operations on lists. The visual set operations can be used to generate lists of email recipients, for example, by performing, corresponding set operations on lists to generate new lists there from, to identify and/or eliminate common elements. However, as described above, the visual set operations can be performed in any suitable application where lists are used, including, but not limited to one or more of a PIM (personal information manager) application, a messaging application, a contact application, a searching application, a filtering, a database application, a permission management application, and the like.

Those skilled in the art will appreciate that in some implementations, the functionality of devices 101, 101a and server 1103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 101a, and server 1103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a processor and a display, the processor configured to:
render, on the display of the device, a graphical user interface (GUI) of a messaging application for composing a message, the GUI comprising an address field for the message, the address field including human-readable text that is descriptive of a first list of message recipients, human-readable text that is descriptive of a second list of message recipients and, the address field further including a visual actuator, wherein the first list of message recipients and the second list of message recipients share common message recipients;
in response to receipt of actuation input indicating that the visual actuator has been actuated, render, in the address field, a first non-textual graphical representation labelled with the human-readable text that is descriptive of the first list of message recipients, a second non-textual graphical representation labelled with the human-readable text that is descriptive of the second list of message recipients, and a graphical intersection of the first non-textual graphical representation and the second graphical representation, the graphical intersection indicative of the common message recipients; and in response to receipt of input at one or more of a touch screen of the display and an input device, the input comprising a selection of the graphical intersection in the address field and the input further comprising a dragging of the graphical intersection away from the first non-textual graphical representation and the second non-textual graphical representation:
separate, in the address field, the graphical intersection from one or more of the first non-textual graphical representation and the non-textual second graphical representation so that the first non-textual graphical representation, the second graphical non-textual representation, and the graphical intersection are non-overlapping;
generate one or more additional lists, each of the one or more additional lists comprising a respective one of:
the common message recipients;
the first list minus the common message recipients; and,
the second list minus the common message recipients; and,
alter an appearance of at least one of the first non-textual graphical representation, the second non-textual graphical representation, and the graphical intersection in the address field to be labelled with human-readable text that is descriptive of one of the additional lists that is generated.

2. The device of claim 1, further comprising one or more of:
a memory storing one or more of the first list and the second list; and,
a communication interface configured to communicate with a server storing one or more of the first list and the second list, wherein the one or more additional lists are generated at the server via exchange of data with the device, the data indicative of one or more of the first list and the second list, and separation of the graphical intersection from one or more of the first non-textual graphical representation and the second non-textual graphical representation.

3. The device of claim 1, wherein the processor is further configured to alter the appearance of the first non-textual graphical representation in the address field to be labelled with human-readable text that is descriptive of the additional list comprising the first list minus the common message recipients.

4. The device of claim 1, wherein the processor is further configured to alter the appearance of the second non-textual graphical representation in the address field to be labelled with human-readable text that is descriptive of the additional list comprising the second list minus the common message recipients.

5. The device of claim 1, wherein the processor is further configured to, in response to receipt of the input, alter the appearance of the graphical intersection in the address field to be labelled with human-readable text that is descriptive of the additional list comprising the common message recipients.

6. The device of claim 1, wherein separating the graphical intersection in the address field from the first non-textual graphical representation and the second non-textual graphical representation comprises a visual set operation, and generating one or more additional lists comprises a corresponding set operation.

7. The device of claim 1, wherein the processor is further configured to identify the common message recipients of the first list and the second list based on respective fields of the message recipients of each of the first list and the second list.

8. The device of claim 1, wherein a size of one or more of the first non-textual graphical representation, the second non-textual graphical representation and the graphical intersection in the address field is indicative of a respective number of message recipients in the first list, the second list and the common message recipients.

9. The device of claim 1, wherein each of the first non-textual graphical representation and the second non-textual graphical representation comprises one or more of a Venn diagram, a geometric object, a circle, a square, a triangle and an irregular geometric object located in the address field.

10. The device of claim 1, wherein the processor is further configured to:
alter an appearance of at least one of the first non-textual graphical representation, the second non-textual graphical representation, and the graphical intersection in the address field to provide an actuator to discontinue the rendering of the at least one of the first non-textual graphical representation, the second non-textual graphical representation, and the graphical intersection in the address field.

11. A method comprising:
rendering, on a display of a device, a graphical user interface (GUI) of a messaging application for composing a message, the GUI comprising an address field for the message, the address field including human-readable text that is descriptive of a first list of message recipients and human-readable text that is descriptive of a second list of message recipients, the address field further including a visual actuator, wherein the first list of message recipients and the second list of message recipients share common message recipients;
in response to receipt of actuation input indicating that the visual actuator has been actuated, rendering on the display of the device, in an address field of the message, a first non-textual graphical representation labelled with the human-readable text that is descriptive of the first list of message recipients, a second non-textual graphical representation labelled with the human-readable text that is descriptive of the second list of message recipients, and a graphical intersection of the first non-textual graphical representation and the second non-textual graphical representation, the graphical intersection indicative of the common message recipients; and,
in response to receipt of input at one or more of a touch screen of the display and an input device, the input comprising a selection of the graphical intersection in the address field and the input further comprising a dragging of the graphical intersection away from the first non-textual graphical representation and the non-textual second graphical representation:
separating the graphical intersection from one or more of the first non-textual graphical representation and the second non-textual graphical representation so that the first non-textual graphical representation, the second non-textual graphical representation, and the graphical intersection are non-overlapping;
generating one or more additional lists, each of the one or more additional lists comprising a respective one of:
the common message recipients;
the first list minus the common message recipients; and,
the second list minus the common message recipients; and
altering an appearance of at least one of the first non-textual graphical representation, the second non-textual graphical representation, and the graphical intersection in the address field to be labelled with human-readable text that is descriptive of one of the additional lists that is generated.

12. The method of claim 11, further comprising one or more of:
  storing one or more of the first list and the second list at a memory of the device; and,
  communicating, via a communication interface of the device, with a server storing one or more of the first list and the second list, wherein the one or more additional lists are generated at the server via exchange of data with the device, the data indicative of one or more of the first list and the second list, and separation of the graphical intersection from one or more of the first non-textual graphical representation and the second non-textual graphical representation.

13. The method of claim 11, further comprising altering the appearance of the first non-textual graphical representation in the address field to be labelled with human-readable text that is descriptive of the first list minus the common message recipients, when the graphical intersection is separated there from.

14. The method of claim 11, further comprising altering the appearance of the second non-textual graphical representation to be labelled with human-readable text that is descriptive of the second list minus the common elements, when the graphical intersection is separated there from.

15. The method of claim 11, further comprising altering the appearance of the graphical intersection in the address field to be labelled with human-readable text that is descriptive of the common message recipients, when the graphical intersection is separated there from.

16. The method of claim 11, wherein the separating the graphical intersection in the address field from one or more of the first non-textual graphical representation and the second non-textual graphical representation comprises a visual set operation, and the generating one or more additional lists based on the separating comprises a corresponding set operation.

17. The method of claim 11, further comprising identifying the common message recipients of the first list and the second list based on respective fields of the message recipients of each of the first list and the second list.

18. The method of claim 11, wherein a size of one or more of the first non-textual graphical representation, the second non-textual graphical representation and the graphical intersection in the address field is indicative of a respective number of message recipients in the first list, the second list and the common message recipients.

19. The method of claim 11, wherein each of the first non-textual graphical representation and the second non-textual graphical representation comprises one or more of a Venn diagram, a geometric object, a circle, a square, a triangle and an irregular geometric object located in the address field.

20. The method of claim 11, wherein altering an appearance of at least one of the first non-textual graphical representation, the second non-textual graphical representation, and the graphical intersection in the address field comprises providing an actuator for discontinuing the rendering of the at least one of the first non-textual graphical representation, the second non-textual graphical representation, and the graphical intersection in the address field.

21. A non-transitory computer program product, comprising a computer usable medium having a computer readable program code adapted to be executed to implement a method comprising:
  rendering, on a display of a device, a graphical user interface (GUI) of a messaging application for composing a message, the GUI comprising an address field for the message, the address field including human-readable text that is descriptive of a first list of message recipients and human-readable text that is descriptive of a second list of message recipients, the address field further including a visual actuator, wherein the first list of message recipients and the second list of message recipients share common message recipients;
  in response to receipt of actuation input indicating that the visual actuator has been actuated, rendering on the display of the device, in an address field of the message, a first non-textual graphical representation labelled with the human-readable text descriptive of the first list of message recipients and the second non-textual graphical representation labelled with the human-readable text descriptive of a second list of message recipients, and a graphical intersection of the first non-textual graphical representation and the second non-textual graphical representation, the graphical intersection indicative of the common message recipients;
  in response to receipt of input at one or more of a touch screen of the display and an input device, the input comprising a selection of the graphical intersection in the address field and the input further comprising a dragging of the graphical intersection away from the first non-textual graphical representation and the second non-textual graphical representation:
  separating the graphical intersection from one or more of the first non-textual graphical representation and the second non-textual graphical representation so that the first non-textual graphical representation, the second non-textual graphical representation, and the graphical intersection are non-overlapping;
  generating one or more additional lists, each of the one or more additional lists comprising a respective one of:
  the common message recipients;
  the first list minus the common message recipients; and,
  the second list minus the common message recipients; and
  altering an appearance of at least one of the first non-textual graphical representation, the second non-textual graphical representation, and the graphical intersection in the address field to be labelled with human-readable text that is descriptive of one of the additional lists that is generated.

22. The non-transitory computer program product of claim 21, wherein altering an appearance of at least one of the first non-textual graphical representation, the second non-textual graphical representation, and the graphical intersection in the address field comprises providing an actuator for discontinuing the rendering of the at least one of the first non-textual graphical representation, the second non-textual graphical representation, and the graphical intersection in the address field.

* * * * *